Dec. 14, 1937. P. M. RAIGORODSKY Re. 20,587
METHOD OF RECOVERING HYDROCARBON VAPORS
Original Filed Dec. 29, 1930
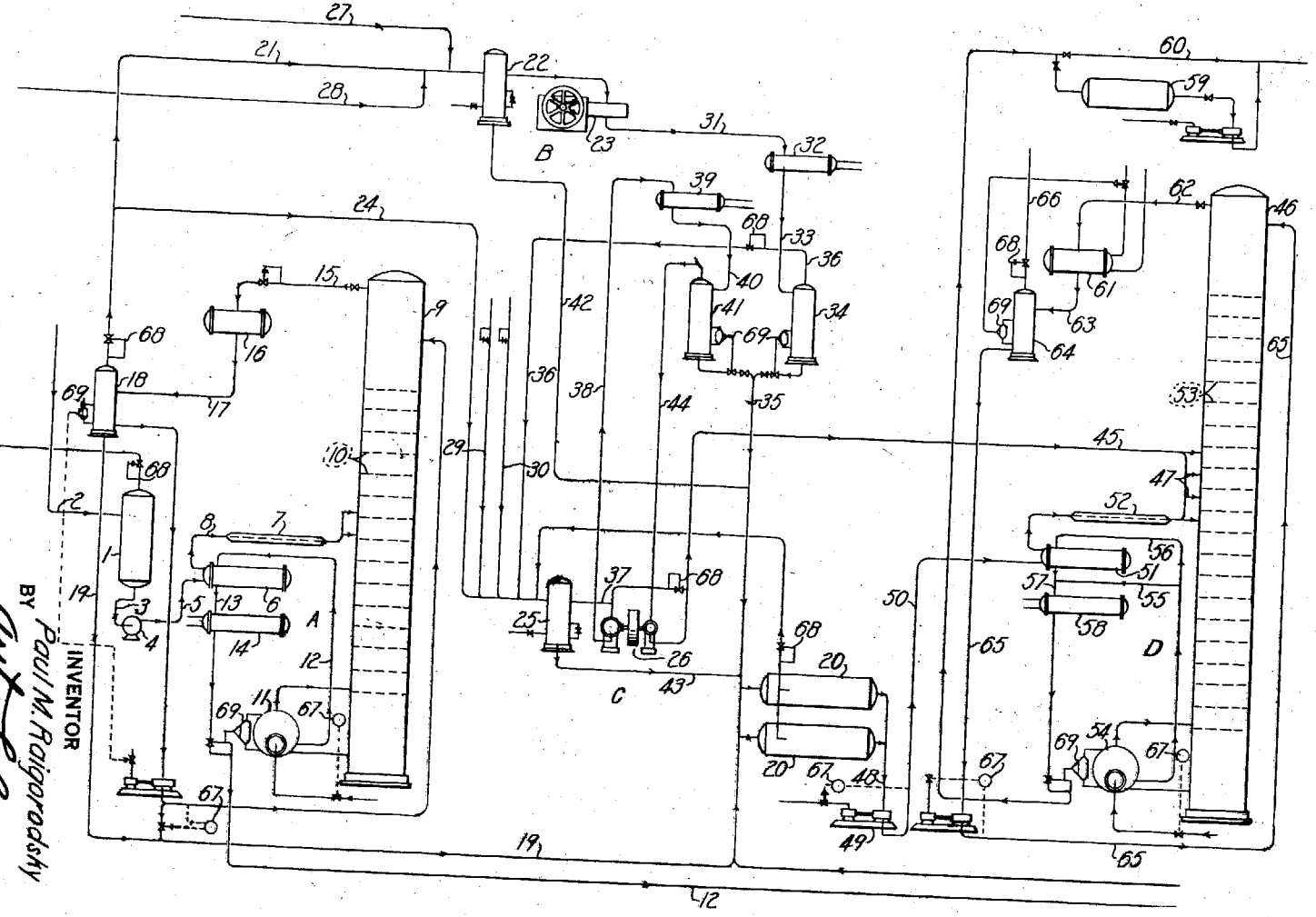
INVENTOR
Paul M. Raigorodsky
BY
Arthur C. Brown
ATTORNEY Reissued Dec. 14, 1937

Re. 20,587

UNITED STATES PATENT OFFICE 20,587

METHOD OF RECOVERING HYDROCARBON VAPORS

Paul M. Raigorodsky, Tulsa, Okla., assignor to Petroleum Engineering, Inc., Tulsa, Okla., a corporation of Delaware Original No. 1,977,087, dated October 16, 1934, Serial No. 505,381, December 29, 1930. Application for reissue September 11, 1936, Serial No. 100,286

7 Claims. (Cl. 196—11)

My invention relates to a method of recovering vapors from pressure distillate, or any other product derived from cracking or topping of crude petroleum and its by-products, and comprising a series of hydrocarbons and accompanying vapors.

In methods formerly employed such vapors were recovered to a large extent by several stages of compressions; coolers, condensers and separators being used between the various stages.

The principal objection to this method, however, was the remaining high content of usable hydrocarbons in the residue gas, and the vapors thus derived and condensed were not sufficiently controlled as to their composition, recovery, gravity, etc.

In later practice an absorption type of plant was designed for recovering the greater percentage of the vapors in a more economical manner.

This type of plant, wherein the absorber contains a plurality of trays, of which the bubble type is most common, is used for absorbing the desirable gasoline and lighter fractions of petroleum in a heavier oil, the combined oil being delivered to a still. The vapors freed in the still are conducted therefrom through fractionating equipment for removing the entrained oil and for dividing the vapors into desired fractions which are finally condensed.

Although this method is a great improvement over the former method the installation and operating costs of the absorption type of plant is comparatively great, and undesirable or uncontrolled amounts of propane and butane or other hydrocarbons remain in the final product.

In later equipment stabilizers or rectifiers were added to remove the undesirable light ends after the product had been passed through the fractionating equipment.

The principal objects of my invention are to further decrease the installation and operating costs of plants for the recovery of desirable hydrocarbons from refinery vapors and to control the recovery of the volatile products such as propane and butane, thereby producing a more stable and controlled product not subject, to such a great degree, to evaporation and weathering.

In accomplishing these and other objects of my invention I have provided an arrangement of apparatus wherein the absorption plant is entirely eliminated and wherein the vapors, heated by compression, are conducted at high pressures directly to a rectifier without cooling, or condensing, or separation.

The arrangement of the apparatus is illustrated in the accompanying diagrammatical drawing or flow sheet of the plant.

The apparatus may for convenience be divided into four units as follows:

(A) The debutanizer wherein butane and propane are separated from pressure distillate or other charging stock.

(B) The low pressure compressor for taking uncondensed vapors from the debutanizer and preferably mingling them with tail gases from crude distillation streams and vapors from storage tanks and loading racks.

(C) The high pressure compressor whereby vapors passing through unit B are delivered to the stabilizing rectifier.

(D) The rectifier wherein hot vapors from unit A are stabilized, either alone or with distillate from units A and B.

In practicing my improved method with the apparatus illustrated in the drawing, and by particular reference to treatment of pressure distillate of crude oil from the Mid-Continent field, 1 designates a run down storage tank for receiving pressure distillate at about 20 pounds gauge pressure through a line 2 from a source of supply, such as a cracking still (not shown).

From the storage tank the liquid distillate is drawn through a line 3 by a pump 4 and delivered through a line 5, heat exchanger 6, line 8 and preheater 7 into a debutanizer 9 at pressure ranging from thirty to seventy-five pounds and temperature of approximately 150° F., according to the product desired.

The debutanizing column is preferably of tray type, as indicated at 10, for effecting fractional distillation of liquid and vapors, although sharp cuts are not obtained either in the bottom or top products, the bottom products, however, being substantially stable. Liquid drawn from the bottom of the stabilizing column is passed by a line 12 through a kettle or reboiler 11 where it is heated to approximately 300° F. at a pressure of about thirty pounds, through the heat exchanger 6, connecting line 13 and cooler 14 to storage outside the system here involved.

Bottom product of the debutanizer for a charging stock of the character stated selected for example may consist of the following combination:

| | Mol. percent | Liquid volume percent |
|---|---|---|
| Methane | | |
| Ethane | | |
| Propane | .87 | .48 |
| Butanes | 7.87 | 5.36 |
| Pentanes | 27.09 | 21.75 |
| Hexanes and heavier | 31.03 | 27.88 |
| | 33.14 | 44.53 |

The debutanizer bottoms have an Engler distillation as follows:

| | |
|---|---|
| Gravity | 48.2 |
| I D | 140 |
| 10% | 208 |
| 20% | 250 |
| 30% | 283 |
| 40% | 318 |
| 50% | 351 |
| 60% | 378 |
| 70% | 404 |
| 80% | 426 |
| 90% | 441 |
| 99% endpoint | 462 |

The overhead product, including light ends of vapors returned to the column from the reboiler, are led off by line 15 through a cooler 16 and pass through a line 17 to a separator 18 at about 80° F. A limited quantity of condensate is drawn from the separator 18 to the debutanizer column for reflux and the balance conducted to mixing tanks 20 in the stabilizer unit.

If the debutanizer is operated at pressures less than twenty pounds, vapors uncondensed from the separator 18 are drawn through a line 21 and scrubber 22 into a single stage compressor 23. If the debutanizer is operating at pressures over twenty pounds the uncondensed gases from separator 18 may be led through a scrubber 25 to the high pressure compressor 26 for direct delivery to the stabilizing column. Vapors drawn from outside the debutanizing system enter the system through lines 27 and 28 to unite with vapors drawn from separator 18 to pass therewith through the scrubber 22 into compressor 23.

Outside vapors may be supplied to the storage tank through the high pressure compressor and its scrubber by lines 29 and 30. Condensate in the scrubber 22 of the low pressure unit is drawn off to the storage tank through line 42.

Vapors, leaving the compressor 23 at a pressure of about forty-five pounds, are passed through a cooler 32 into an accumulator tower 34 where a further separation takes place, condensate passing from the lower portion of the tower 34 through line 35 to mixing tank 20. Vapors uncondensed in the tower 34 pass through line 36 to the scrubber 25 of the high compression unit, and condensate of said vapors, with that of other vapors entering the scrubber, pass to the mixing tank. Vapors uncondensed in the scrubber 25 are drawn into the low pressure cylinder of compressor 26 through a line 37 and pass from the low pressure cylinder through a line 38, cooler 39 and line 40 into an accumulator 41, where further separation takes place, condensate passing from the accumulator through line 35 at a pressure of approximately eighty pounds to the mixing tank 20.

Vapors uncondensed in the accumulator 41 are drawn through line 44 to the high stage cylinder of the compressor 26 and delivered from said cylinder, at a pressure of approximately three hundred pounds, through a line 45 into the stabilizing rectifier column 46, preferably at spaced points indicated at 47, together with condensate drawn from the mixing tank 20 through a line 48 by a pump 49 and by the pump delivered through line 50, heat exchanger 51 and preheater 52 to join vapors delivered through line 45 for inlet to the column 46 at the points 47.

The rectifier 46 is of bubble plate type, including a sufficient number of fractionating trays to effect close fractionation to a top separation of propane and lighter hydrocarbons with a variable amount of butane according to the bottom product desired. The lower fractions collecting at the bottom of the rectifier are removed through a reboiler 54, and in divided flow through line 55 and through shunt line 56 and heat exchanger 51, line 57 and cooler 58 to a temperary storage tank 59, or directly through a line 60 to a treating plant (not shown). The commingled vapors from the compressor and mixing tank enter the rectifier at a temperature of from 180° to 200° F.

The overhead product passes from the top of the rectifier through line 62, cooler 61 and the line 63 to a separator 64. Non-condensible gases are drawn from the separator through line 66 as dry gas for fuel, and liquid condensate pumped from the separator through line 65 at a temperature of about 75° F. for reflux in the rectifier column.

Feed to the rectifier and reflux to both the debutanizer and rectifier columns is controlled by volume controllers 67 in the respective lines, and regulators 68 are provided for maintaining desired pressures in the vapor separators, the debutanizer and rectifier columns, the accumulator 34 and in the mixing tank. Temperatures in the reboilers 11 and 54 are automatically controlled by regulators 69.

The stabilized product from the rectifier, when containing about eighty percent of the available butane available in the combined feed to the column, has the following characteristics:

| | Percent |
|---|---|
| Propane | .5 |
| Iso-butane (n-butane) | 38.5 |
| Pentane | 31.7 |
| Hexane | 29.3 |

If desired, the recovery of the butane may be increased to something over ninety per cent.

From the foregoing it is apparent that with my method desirable high boiling point products of cracking stills and casing head plants, or other sources, usually wasted by weathering or like processes, may be stabilized and recovered for use either alone or by blending with other hydrocarbon products and that in effecting separation of the vapors advantage is taken of the heat generated by compression to effect saving in operating costs.

What I claim and desire to secure by Letters Patent is:

1. The method of stabilizing petroleum oil pressure distillate and recovering desired light components thereof which comprises, heating and separating said distillate in a rectification zone into a heavy stabilized fraction and a light fraction containing the desired light components as vapors and undesirable gaseous components, separately removing the fractions from said zone, subjecting the light fraction to condensation and separating condensate from remaining vapors and gases, subjecting said remaining vapors and gases to compression and cooling in a plurality of stages at progressively increasing pressures with separation of condensate from uncondensed vapors and gases after each stage, collecting and mixing together all the condensates, introducing the mixed condensates and said uncondensed vapors and gases into a second rectification zone and rectifying the materials therein into a stabilized light fraction of pressure distillate which is withdrawn in liquid form from the bottom of said zone, and withdrawing gaseous constituents from the top thereof.

2. The method of recovering desirable hydrocarbons from an original normally gaseous charge consisting mainly of normally gaseous constituents and containing said desirable hydrocarbons which consists in subjecting said charge to compression and cooling in a plurality of stages at progressively increasing pressures with separation of condensates from uncondensed portions of the charge after each of said stages except the final one, introducing the portion of the charge leaving the final stage of compression directly into a rectification zone, mixing said condensates and introducing the resulting mixture into said rectification zone, therein rectifying all of these materials into a stabilized fraction containing said desirable hydrocarbons which is withdrawn from the bottom of said zone and withdrawing the remainder of said charge from the top thereof.

3. The method of recovering desirable hydrocarbons from an original normally gaseous charge consisting mainly of normally gaseous constituents and containing said desirable hydrocarbons which consists in subjecting said charge to compression and cooling in a plurality of stages at progressively increasing pressures with separation of condensates from uncondensed portions of the charge after each of said stages except the final one, introducing the portion of the charge leaving the final stage of compression directly and without cooling into a rectification zone, mixing said condensates and introducing the resulting mixture into said rectification zone, therein rectifying all of these materials into a stabilized fraction containing said desirable hydrocarbons which is withdrawn from the bottom of said zone and withdrawing the remainder of said charge from the top thereof.

4. The method of recovering desirable hydrocarbons from an original normally gaseous charge consisting mainly of normally gaseous constituents and containing said desirable hydrocarbons which consists in subjecting said charge to compression and cooling in a plurality of stages at progressively increasing pressures with separation of condensates from uncondensed portions of the charge after each stage, collecting and mixing together all the condensates, heating the mixed condensates, introducing the mixed and heated condensates and said uncondensed portion of the charge into a rectification zone, therein rectifying these materials into a stabilized fraction containing said desirable hydrocarbons which is withdrawn from the bottom of said zone and withdrawing the remainder of said charge from the top thereof.

5. The method of recovering desirable hydrocarbons from an original normally gaseous charge consisting mainly of normally gaseous constituents and containing said desirable hydrocarbons, which consists in subjecting said charge to compression and cooling in a plurality of stages at progressively increasing pressures with separation of condensates from the uncondensed portion of the charge after each stage, collecting and mixing together all of the condensates, introducing the mixed condensates into a rectification zone, also introducing said uncondensed portion of the charge without cooling into the same rectification zone, rectifying said condensates and said uncondensed portion of the charge in said rectification zone into a stabilized fraction containing said desirable hydrocarbons which is withdrawn from the bottom of said zone and withdrawing the remainder of said charge from the top thereof.

6. The method of recovering desirable hydrocarbons from an original normally gaseous charge consisting mainly of normally gaseous constituents and containing said desirable hydrocarbons which consists in dividing said charge into a gaseous stream and a liquid stream by subjecting said charge to stage compression and cooling at progressively increasing pressures with separation of condensate from the uncondensed portion of the charge between the stages, the finally uncondensed portion of said charge forming said gaseous stream and said condensate forming said liquid stream, introducing said liquid stream into a rectification zone, also introducing said gaseous stream without cooling into said zone, rectifying said streams in said zone into a stabilized fraction containing said desirable hydrocarbons which is withdrawn from the lower portion of said zone and withdrawing the remainder of said charge from the upper portion thereof.

7. The method of recovering desirable hydrocarbons from an original normally gaseous charge consisting mainly of normally gaseous constituents and containing said desirable hydrocarbons which consists in dividing said charge into a gaseous stream and a liquid stream by subjecting said charge to stage compression and cooling at progressively increasing pressures, with separation of condensate from the uncondensed portion of the charge between the stages except the final one, the finally uncondensed portion of said charge forming said gaseous stream and said condensate forming said liquid stream, introducing said liquid stream into a rectification zone, also introducing said gaseous stream directly into said zone, rectifying said streams in said zone into a stabilized fraction containing said desirable hydrocarbons which is withdrawn from the lower portion of said zone and withdrawing the remainder of said charge from the upper portion thereof.

PAUL M. RAIGORODSKY.